United States Patent [19]

Grossiord

[11] Patent Number: 4,809,551
[45] Date of Patent: Mar. 7, 1989

[54] DEVICE FOR DETECTING THE LIQUID LEVEL IN A TANK, PARTICULARLY A LIGHTER TANK AND TANK PROVIDED WITH SUCH DEVICE

[75] Inventor: Claude Grossiord, Annecy, France
[73] Assignee: S.T. Dupont, Paris, France
[21] Appl. No.: 761,249
[22] Filed: Aug. 1, 1985

Related U.S. Application Data

[63] Continuation-in-part of Ser. No. 566,139, filed as PCT FR83/00065 on Apr. 8, 1983, published as WO83/03670 on Oct. 27, 1983, abandoned.

[51] Int. Cl.$^4$ ............................................. G01F 23/02
[52] U.S. Cl. ..................................... 73/327; 116/227; 73/293
[58] Field of Search ................... 73/293, 327; 116/227; 350/96.19, 96.22, 96.24, 287

[56] References Cited

U.S. PATENT DOCUMENTS

| | | | |
|---|---|---|---|
| 3,120,125 | 2/1964 | Vasel | 73/327 |
| 3,345,870 | 10/1967 | Yoshinaga | 73/327 |
| 3,347,649 | 10/1967 | Singer | 350/96.24 |
| 3,362,224 | 1/1968 | Melone | 73/327 |
| 3,367,184 | 2/1968 | McHugh | 73/327 |
| 3,528,291 | 9/1970 | Melone | 73/327 |
| 3,535,934 | 10/1970 | Rapata | 73/327 |
| 3,648,521 | 3/1972 | Amendolia | 73/327 |

Primary Examiner—Allan N. Shoap
Assistant Examiner—Patrick R. Scanlon
Attorney, Agent, or Firm—Ladas & Parry

[57] ABSTRACT

A device for detecting the liquid level in a tank. The device inlcudes a dioptric element having faces and a base immersible in the liquid. A bundle of optical fibers is operationally arranged with the dioptric element so that the dioptric element is disposed at one plane end of the optical fiber bundle while the other plane end of the optical fiber bundle provides an observation face. The bundle of optical fibers and the dioptric element are arranged and adapted to provide two separate and distinct zones in the observation face which are directly viewable in the surface of the observation face. One zone provides a signal zone which receives a larger quantity of light from a dioptric element when the element is not immersed than when it is immersed. The other zone provides a reference zone which receives a constant quantity of light from the dioptric element whether or not the dioptric element is immersed in the liquid.

2 Claims, 2 Drawing Sheets

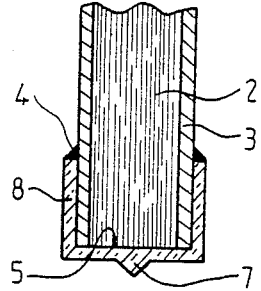
FIG.1
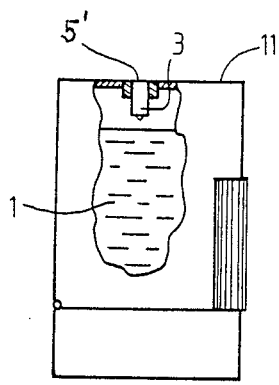
FIG.2
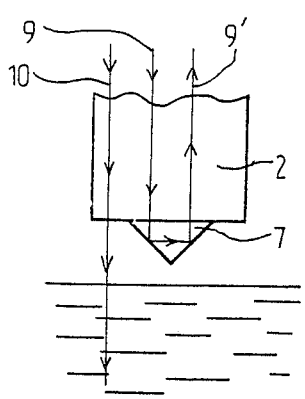
FIG.5
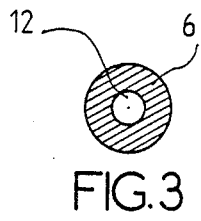
FIG.3
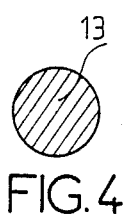
FIG.4
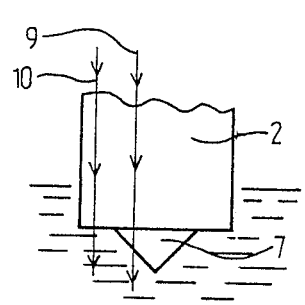
FIG.6
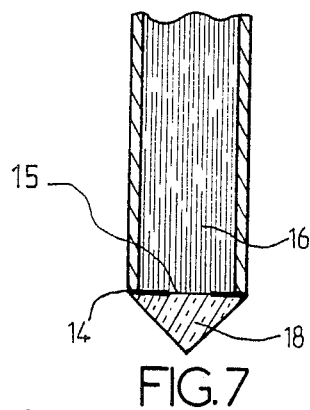
FIG.7
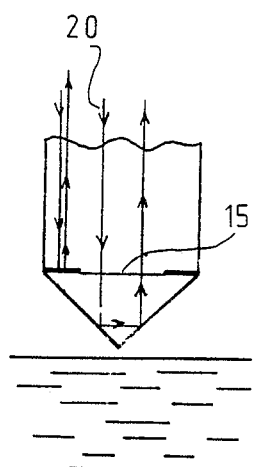
FIG.8
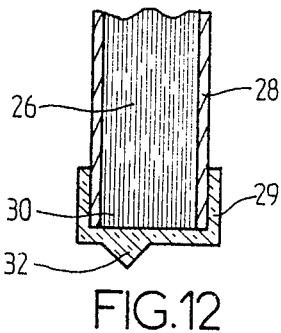
FIG.12
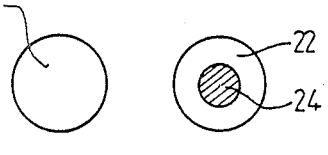
FIG.10  FIG.11
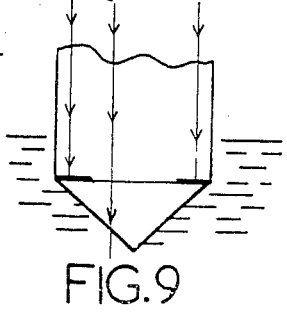
FIG.9
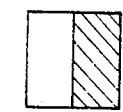
FIG.13
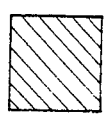
FIG.14

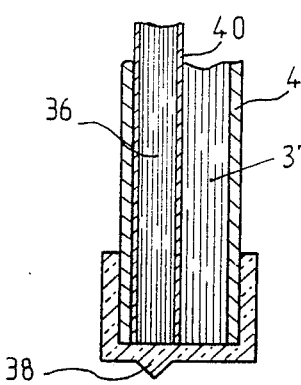
FIG.15
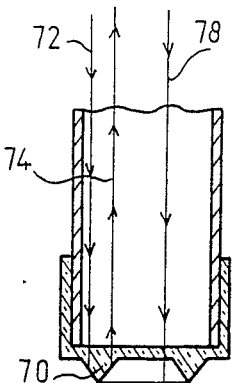
FIG.17
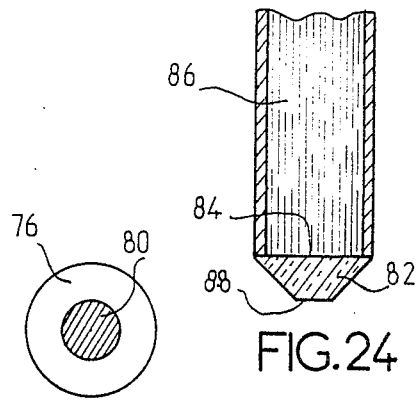
FIG.24
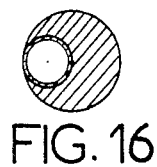
FIG.16
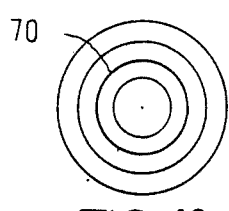
FIG.18
FIG.19
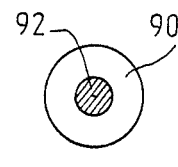
FIG.25
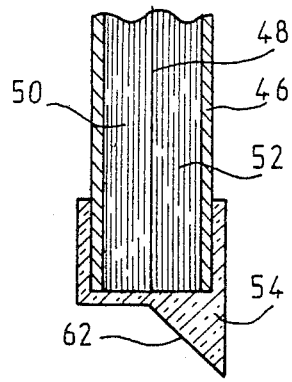
FIG.20
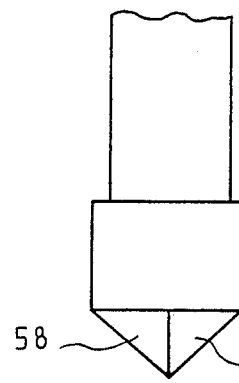
FIG.21
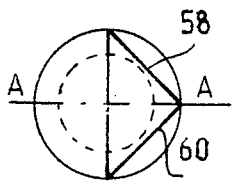
FIG.22
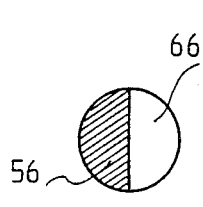
FIG.23
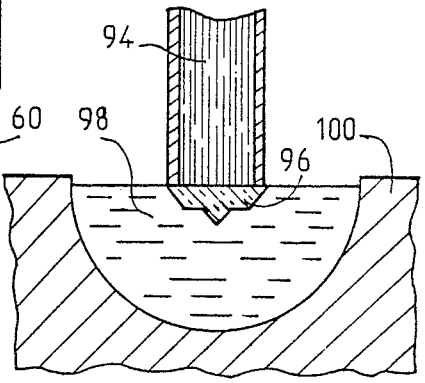
FIG.26

DEVICE FOR DETECTING THE LIQUID LEVEL IN A TANK, PARTICULARLY A LIGHTER TANK AND TANK PROVIDED WITH SUCH DEVICE

CROSS REFERENCE TO RELATED APPLICATIONS

This Application is a continuation-in-part of U.S. Application Serial No. 566,139 filed as PCT FR83/00065 on Apr. 8, 1983, published as WO83/03670 on Oct. 27, 1983, now abandoned.

BACKGROUND OF THE INVENTION

Part 1. The Field of the Invention

The subject of the present invention is a device enabling the level of a liquid in a tank to be detected, in particular the level of a liquefied gas in a lighter tank. It is to this particular application that detailed reference will be made hereinafter, but it will appear clearly to the individual skilled in the art that the invention extends to any other tank of liquid.

Part 2. Description of the Prior Art

Most gas cigarette lighters have no device giving the user an indication as to the quantity of gas remaining in the tank. Of course, lighters are known whose transparent or translucent bodies enable the level of liquefied gas to be distinguished. However, in addition to the fact that these lighters are generally of mediocre quality, monitoring the gas level is generally difficult because it forces the user to incline the lighter to clearly distinguish the connecting line to the free liquid surface on the wall of the lighter body.

The use has also been proposed of optical devices which, disposed in the bottom of a tank, allow a colored pellet to appear as long as the lighter contains gas, this pellet disappearing when the tank is empty. However, the low luminosity of the signal transmitted and the requirement for the user to make his observation at an angle very close to the axis of the system have caused this type of device to be abandoned.

In different technical fields, another type of device for detecting the level of a liquid in a container is also known. This device has a bar of transparent material, one cone-shaped end of which, with a vertex angle equal to 90°, can be immersed or not immersed according to the level of liquid in the container. The refractive index of the bar is chosen, by comparison to that of the liquid, such that, when its end is immersed in the liquid, the incident light rays transmitted by the transparent material refract at the interface separating this material from the liquid and become lost in the liquid, and such that, when this end is not immersed, the incident light rays undergo total double reflection by meeting said interface twice and are sent to the other end of the bar. In the first case, the user perceives a dark part which is, in fact, the bottom of the tank and in the second case he perceives a lighter part. He can thus determine whether the level of liquid is located above or below the end of the transparent bar.

It has also been proposed, with the goal of making remote reading of this type of device possible, that a bundle of light-conducting fibers, hereinafter called optical fibers, be associated with the bar of transparent material. These fibers carry the indicating signal from the measuring point to the observation point. However, due to the low luminosity of their signals, these devices are generally extremely difficult to read.

For this reason, it has been proposed that the paths of the incident, reflected light rays be separated into two separate bundles of optical fibers. Thus, a light source illuminates the transparent bar by a first bundle of optical fibers and, after reflection, the light rays return to the observer via a second bundle of optical fibers.

Although this type of device, due to its good luminosity, proves to be extremely accurate and readable, it can only be used in the case where a light source is available and where space-availability problems are not critical. This is not the case when this device is to be fitted to a tank of small dimensions such as that of a ligher.

SUMMARY OF THE INVENTION

The invention presents an improved device for detecting the level of a liquid inside a container, the reading of which is both simple and reliable and the device is sufficiently miniaturizable to be mounted on a tank of small dimensions, for example a lighter tank.

The device of the present invention has a bundle of optical fibers provided on one of its end faces with a dioptric element immersible in the liquid. The other end face, called the observation face, is arranged so as to be visible from the outside of the tank. The dioptric element is able, when not immersed, to send back any incident ray coming from the bundle of optical fibers, to the observation face. The device is further characterized by the observation face being divided into at least two zones. One of the zones is a signal zone able to receive from the dioptric element a larger quantity of light when it is not immersed than when it is immersed. Another zone is a reference zone able to receive from the dioptric element a constant quantity of light whether or not the dioptric element is immersed. Accordingly, the device of the present invention is designed and adapted to provide visible light patterns corresponding to the signal and reference zones in the surface of the observation face. This light pattern is perceived by the viewer and is transmitted directly to the viewer from the surface of the observation face rather than from a surface of the dioptric element. The arrangement provides a sharp, readily viewable light pattern which is directly viewable at various viewing angles under ambient light conditions.

The invention removes all ambiguities in detecting the signal. In fact, since the observation face is divided into two zones, a first detection zone, whose luminosity differs according to whether the dioptric element is immersed, and a second constant-luminosity zone serving as a reference, any difference in luminosity, however small, between the two zones will be easily detected by the user.

According to the invention, since the bundle of optical fibers is composed of a large number of elementary light-conducting fibers, it is possible to dispose the dioptric element opposite the end of only one part of the fibers in the bundle. Thus, only the light rays conducted by said part of the fibers opposite the dioptric element can undergo total reflection before leaving the bundle via the observation face, rendering the latter luminous, while those conducted by the other fibers will become lost inside the tank, resulting in a dark reference zone.

The contrast between the light detection zone and the reference zone could also be improved by coloring the dioptric element and hence the corresponding reflected light beam.

Transmission of the reflected rays is improved by the presence of a liquid between the end of the bundle of optical fibers and the dioptric element; this liquid must have a refractive index close to that of these two elements. In an alternative embodiment of the invention, this liquid will be replaced by an adhesive with an appropriate refractive index which, in addition to its mechanical holding role, will ensure optical continuity between the two transparent elements.

In an attractive alternative embodiment of the invention, the dioptric element will be placed in a cavity at the bottom of the tank. By selecting the volume thereof, one can establish the number of lights that can still be furnished by a lighter after appearance or disappearance of two different lighting zones on the observation face.

This cavity can have a semispherical cross section and the dioptric element can be placed essentially in the center thereof. In this manner, the reading will not be disturbed if the lighter is not held in a strictly vertical position.

DESCRIPTION OF THE DRAWINGS

The attached drawings illustrate various embodiments of the invention. In these drawings:

FIG. 1 is a cross section of a first embodiment of the device;

FIG. 2 is a partial cross section of a lighter in the inverted position, equipped with a device according to FIG. 1;

FIGS. 3 and 4 represent the observation face perceived by the user, when the dioptric element is not immersed and when it is immersed, respectively;

FIGS. 5 and 6 show schematically the path of the light rays when the dioptric element is not immersed and is immersed, respectively;

FIG. 7 shows a second embodiment of the device;

FIGS. 8 and 9 illustrate respectively the path of the light rays in the device of FIG. 7 in the case where the dioptric element is not immersed and is immersed, respectively;

FIGS. 10 and 11 represent the observation face perceived in the cases of FIGS. 8 and 9, respectively;

FIG. 12 shows a third embodiment of the device according to the invention;

FIGS. 13 and 14 represent the observation face perceived when the dioptric element is immersed and is not immersed, respectively;

FIGS. 15 and 16 show a fourth embodiment of the device and the observation face perceived, respectively;

FIGS. 17, 18, and 19 represent a fifth embodiment of the device, a view of the device from below and the observation face perceived, respectively;

FIGS. 20 to 23 represent a cross-sectional view of a sixth embodiment of the device, an elevation view of the device, a view from below, and the observation face perceived, respectively;

FIGS. 24 and 25 show a seventh embodiment of the device and the observation face perceived, respectively; and FIG. 26 is a partial cross-sectional view of the device disposed in a cavity of the tank.

DESCRIPTION OF PREFERRED EMBODIMENTS

According to the invention, in FIGS. 1 to 6, the tank 1 of a lighter is fitted with a device enabling the user to detect whether the gas is situated above or below a given level, and hence to ensure that the lighter is properly filled.

This device is composed of a bundle 2 of optical fibers, L accommodated in a rigid sheath 3 of which one end 5 disposed in the tank, essentially at the level to be detected, is fitted with a 1 dioptric element 7, while its other end 5' is attached to the bottom 11 of the lighter. This attachment can be made by any means known in the art. The dioptric element is composed of a cone 7, formed from example by molding, on a "Plexiglas" (registered trademark) stopper 8 capping the ends of the bundle of fibers 2 and of rigid sheath 3. It is glued to the side walls of the latter and an elastomer seal 4 prevents liquid from passing between the two parts. The base diameter of element 7 is about half that of the bundle of fibers. Thus, when cone 7 is not immersed (FIG. 5) the light rays arriving via fibers 9 situated at right angles to cone 7 undergo total double reflection at the faces at 90° from the cone, and re-emerge via fibers 9'. The light rays conducted by fibers 10 at the periphery of the bundle do not encounter cone 7 and hence do not undergo total reflection. Hence they are not deflected and become lost inside the lighter tank.

The user observing the cross section 5' of the bundle of optical fibers situated outside the lighter and hereinafter called observation face, will distinguish two zones of different luminosities (FIG. 3): a dark annular zone 6 corresponding to the fibers conducting the light rays which have not undergone total reflection, and a central circular zone 12, which is lighter, corresponding to the fibers conducting the light rays reflected by cone 7.

On the other hand, when cone 7 is immersed (FIG. 6). 1 rays 9 and 10 do not undergo total reflection and become lost in the lighter tank. Observation surface 13 then appears uniformly dark (FIG. 4).

Thus, the contrast between annular zone 6 and central zone 12, when cone 7 is not immersed, is easy for the user to identify.

The reference zone is not necessarily the darkest zone. Thus, in FIGS. 7 to 11, a thin reflecting washer is glued to the end 16 of the bundle of fibers. The dioptric element composed of a glass cone 18 is attached, for example by an adhesive product, to said washer 14. As shown in the sketches in FIGS. 8 and 9, only the light rays 20 conducted by the fibers situated at right angles to hole 15 in washer 14 are able, when cone 18 is immersed (FIG. 19), to become lost in the liquid and thus not be reflected to the observation face.

Thus, when cone 18 is immersed (FIG. 9), the user can see (FIG. 11) an observation face composed of a dark disk 24 surrounded by a light corona 22 and when the cone is not immersed (FIG. 8) he can see a uniformly light observation face 23 (FIG. 10).

Of course, the luminosities of the disk and the corona can be reversed by removing washer 14 and mounting a reflecting disk on hole 15.

Of course, the bundle of fibers and the dioptric element used can have a cross section other than circular.

In FIGS. 12 to 14, bundle of fibers 26 is held by a tube 28 with a square cross section. A stopper 29 with the same cross section, made of a transparent material, is attached to its end 30. It is provided with a dioptric element composed of a prism 32 whose base occupies about half the base surface of the bundle of fibers.

Thus, when prism 32 is not immersed and immersed, respectively, the pattern observed in the observation face takes on the appearance in FIGS. 13 and 14.

In the above embodiments, the zones appearing on the observation face assume that the optical fibers constituting the bundle are perfectly arranged, such that two adjacent fibers on the observation face are also adjacent on the surface in contact with the dioptric element.

The embodiment represented in FIGS. 15 and 16 provides freedom from this restriction and furnishes an optical signal of a given shape without requiring a precise arrangement of optical fibers. For this purpose, the fibers are separated into two separate bundles 36 and 37. The fibers of bundle 36 located at right angles to dioptric element 38 are contained in a tube 40, disposed inside sheath 42. One is thus sure that no fiber having an end at right angles to the dioptric element will have its other end in the observation face, which would have the effect of deforming the light signal furnished. When dioptric element 38 is not immersed, the observation face takes on the appearance of FIG. 16, and is dark in the contrary case.

In FIGS. 20 to 23, the fibers contained in tube 46 are separated by an axial partition 48 into two bundles 50 and 52. Diopter element 54 is composed of a prism whose two side faces 58 and 60 are parallel to the axis of the fibers and form an angle to 90° between them, and whose third face 62 forms an angle of 45° with the fiber axis.

The light rays transmitted by the fibers of bundle 50 will thus in all cases become lost inside the tank resulting in a dark zone 56 of semicircular shape on the observation face (FIG. 23). The light rays transmitted by the fibers of bundle 52 will, when dioptric element 54 is not immersed, undergo several total reflections: the first at face 62, the second at face 58 (or at face 60 depending on whether the incident ray is on one side or the other of line A—A), the third at face 60 (or face 58), and finally the fourth at face 62, whence they are retransmitted by bundle 52 to the observation face where they form a semicircular luminous zone 66.

In FIGS. 17 to 19, the dioptric element is composed of a ring 70 with triangular cross section and a vertex angle of 90°. When it is not immersed the incident rays 72 arriving at right angles to the dioptric element undergo total double reflection and are reflected along 74 to the observation face. At the latter, a light annular zone 76 will correspond to them (FIG. 19). On the other hand, the central incident rays 78 undergo no reflection and become lost inside the lighter tank. Hence they will be associated on the observation face with a dark central disk 80.

In the embodiment of FIGS. 24 and 25, the dioptric element is composed of a frustrum of a cone 82. A film of adhesive 84 provides its mechanical connection with the bundle of optical fibers 86 and optical continuity of the two transparent media. An adhesive whose refractive index is close to that of optical fibers 86 and dioptric element 82 will advantageously be chosen.

When the dioptric element is not immersed, only the light rays arriving at right angles to the small base 88 of frustrum 82 are lost in the tank; the others undergo total double reflection and re-emerge at the observation face. The latter is thus (FIG. 25) in the form of a light ring 90 surrounding a dark disk 92.

In FIG. 26, the end of a fiber bundle 94 provided with a dioptric element 96 is engaged in a cavity 98 provided in bottom 100 of the lighter tank. By changing the dimensions of this cavity 98 and the distance between the dioptric element and the bottom of the cavity, an arrangement of this kind enables the number of lightings remaining to the user to be determined after appearance or disappearance of two differently lit zones on the observation face. For example, as the lighter is being used, the level of the liquid gas in cavity 98 will fall until element 96 is no longer immersed in the gas, and this event will provide an appropriate signal viewable in the observation face provided by bundle 94. Since a certain volume of gas corresponds to a given number of possible lightings, the user will know that only a certain number of lightings remain before the lighter must be refilled. The larger the volume of cavity 98, the larger the supply of available fuel to make additional lightings after the user has been signaled that element 96 is no longer immersed in the fluid. Accordingly depending upon the size and shape of cavity 98, the user, by experience, will have an idea as to the number of remaining lightings available until the fuel supply is exhausted. Cavity 98 can have a hemispherical section and dioptric element 96 will be placed essentially at its center. In this way, reading will not be disturbed if the lighter is not held in a strictly vertical position. When tilted slightly, the level of the liquid remains nearly unchanged, i.e., dioptric element 96 remains immersed in the liquid.

The examples above relate to the case of a liquefied-gas tank of a gas lighter, since this application is very advantageous because of the miniaturizability of the device according to the invention. These examples and this application are of course not limitative in nature and the individual skilled in the art can conceive of many other applications to other types of tanks without departing from the scope of the present invention.

Thus, for example, as indicated above, the device according to the invention can be used advantageously to detect a critical filling level of a fuel oil tank, in particular an underground tank. In this case, the free end of the bundle fibers serving as the observation face ca, of course, not be integral with the tank, but be disposed at a location easily accessible to the user.

I claim:

1. A device for detecting the liquid level in a tank of the type having a dioptric element, said dioptric element having faces and a base immersible in the liquid and able, when not immersed, to reflect any ambient light ray encountering the faces of the dioptric element, said device being characterized by said dioptric element (7:32:38:62:70) being disposed at a first plane end of a bundle of optical fibers (2:26:30:50:52:94) and the other plane end of the bundle providing an observation face surface (5), said bundle of optical fibers being operationally arranged in communication with the dioptric element, a reflecting screen (14) interposed between the bundle of optical fibers and dioptric element on part of their common surface to thereby provide two separate and distinct zones in the observation face surface which are directly viewable in the observation face surface, one of said zones providing a signal zone (12) which receives from the dioptric element a larger quantity of light when it is not immersed than when it is immersed and the other zone providing a reference zone (6) which receives from the dioptric element a constant quantity of light whether or not the dioptric element is immersed.

2. A device for detecting the liquid level in a tank of the type having a dioptric element, said dioptric element having faces and a base immersible in the liquid and able, when not immersed, to reflect any ambient light ray encountering the faces of the dioptric element, said device being characterized by said dioptric element (7:32:38:62:70) being disposed at a first plane end of a bundle of optical fibers (2:26:30:50:52:92) and the other plane end of the bundle providing an observation face surface (5), said bundle of optical fibers being operationally arranged in communication with the dioptric element, an absorbent screen interposed between the bundle of optical fibers and the dioptric element on part of their common surface to thereby provide two separate and distinct zones in the observation face surface which are directly viewable in the observation face surface, one of said zones providing a signal zone (12) which receives from the dioptric element a larger quantity of light when it is not immersed than when it is immersed and the other zone providing a reference zone (6) which receives from the dioptric element a constant quantity of light whether or not the dioptric element is immersed.

* * * * *